(12) United States Patent
Wong et al.

(10) Patent No.: US 7,125,160 B2
(45) Date of Patent: *Oct. 24, 2006

(54) LED LIGHT COLLECTION AND UNIFORM TRANSMISSION SYSTEM USING A CONICAL REFLECTOR WITH A ROUGHED UP INNER SURFACE

(75) Inventors: Man Sheung Wong, Hong Kong (CN); Steve Yauhong Yim, Rowland Heights, CA (US); Steven Robert Vetorino, Berthoud, CO (US); Russell E. Sibell, Lafayette, CO (US)

(73) Assignee: Applied Innovative Technologies, Inc., Ft. Lupton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/977,640

(22) Filed: Oct. 29, 2004

(65) Prior Publication Data
US 2006/0092643 A1 May 4, 2006

(51) Int. Cl.
*F21S 4/00* (2006.01)
(52) U.S. Cl. ............... 362/800; 362/545; 362/555; 362/328; 362/309

(58) Field of Classification Search ......... 362/800
See application file for complete search history.

(56) References Cited

U.S. PATENT DOCUMENTS

| 4,327,972 A | * | 5/1982 | Brunsting | .............. 362/335 |
| 5,174,649 A | * | 12/1992 | Alston | .............. 362/309 |
| 6,019,493 A | * | 2/2000 | Kuo et al. | .............. 362/331 |

* cited by examiner

Primary Examiner—Sandra O'Shea
Assistant Examiner—William J Carter
(74) *Attorney, Agent, or Firm*—Macheledt Bales & Heidmiller, LLP; Jennifer L. Bales

(57) ABSTRACT

Apparatus for collecting light from an LED and transmitting it in a near-uniform column incudes a conical reflector having a roughed up inner surface about the base of the LED for collecting light emitted to the sides of the LED, and a lens specially designed to focus the collected light into a near-collimated beam. The lens has opposite, substantially elliptical surfaces to collect and collimate the rapidly diverging light from the LED and the reflector, and each lens surface includes a flat spot to prevent shadows from forming, thereby producing a more uniform beam.

27 Claims, 4 Drawing Sheets

LED LIGHT COLLECTION AND UNIFORM TRANSMISSION SYSTEM USING A CONICAL REFLECTOR WITH A ROUGHED UP INNER SURFACE

BACKGROUND OF THE INVENTION

This application Claims the benefit of U.S. Pat. No. 6,827,475, filed Feb. 12, 2003, which claimed the benefit of Provisional Patent Application No. 60/409,265, filed Sep. 9, 2002.

FIELD OF THE INVENTION

The present invention relates to apparatus and methods for collecting light from a Light Emitting Diode (LED) and transmitting it in a uniform manner.

DESCRIPTION OF THE PRIOR ART

LEDs are increasingly used in a number of devices as a light source. They are small and efficient, and last a long time. For example, several flashlights utilizing LEDs are available. See for example, U.S. Pat. Nos. 5,957,714 and 6,220,719, both having a common inventor with the present invention.

Devices that use LEDs as light sources generally include some method of collecting and/or focusing the light, as light from LEDs is diffuse. FIG. 1 shows a typical LED and the light it generates. A number of prior art devices include a combined reflector and refractor element to collect and transmit the light from an LED. See for example U.S. Pat. No. 5,898,267.

Most devices include optics which image the LED onto a plane in front of the LED. However, with devices such as flashlights, what is desired is not an image of the LED, but rather a column of uniform light.

Some prior art references appreciate this point. For example, a number of known devices use an array of LEDs, and often an array of lenses, to generate a column of light rather than a point source. See for example U.S. Pat. No. 6,283,613.

A need remains in the art for apparatus and methods for providing concentrated uniform light from a single LED.

SUMMARY

The present invention comprises three important elements:
(1) the LED;
(2) A conical reflector for collecting light emitted to the sides of the LED, the reflector having a slightly roughed up inner surface; and
(3) A lens specially designed to focus the collected light into a near-collimated beam.

The LED is generally a conventional LED of the kind having a base, a light element and a domed transparent plastic housing attached to the base and covering the light element. Such an LED produces a bright band of light at the apex of its plastic housing, because of total internal reflection inside the plastic. This light is generally wasted. The reflector has a highly reflecting, but slightly roughed up, inside surface. Preferably, the reflector is a cone with about a 70° angle. This configuration redirects the sideband light from the LED forward.

The lens is specially designed and configured to focus the light directly from the LED and the light reflected from the reflector into a near-collimated uniform beam. The lens has two important features. First, it includes a flat spot in the center of each of its curved surfaces. This prevents the lens from imaging the LED emitter and forming a dark spot in the beam. Consequently, the lens projects a field of near-uniform light. Second, the curved surfaces are elliptical rather than spherical to catch and nearly collimate the quickly diverging light from LED.

The flat spots 4 are preferably designed according to the following equation:

$$0.05d \leq s \leq 0.1d,$$

where s is the diameter of the flat spots, and d is the distance from the front of the LED to the center of the lens. The flat spot produces a near-uniform beam, rather than an image of the LED (with light and dark spots) that is produced by a conventional lens.

The elliptical curvature of the two curved surfaces of the lens is required to catch and nearly collimate the quickly diverging light from the LED. Preferably, the major axis of the ellipse is less than 0.7 times the distance d. Finally, the distance between the center of the ellipses should be about s, the diameter of the flat spots.

In one example, the lens is formed of plastic, and thickness of the lens at an edge is about one third the thickness of the lens at the center. In this example, (d) is approximately 1 inch, the half thickness of the lens is about 0.24 inches, the half diameter (if the elliptical sides were extended to meet) is about 0.70 inches, and edge thickness of the lens is about 0.16 inches.

The reflector surface roughness may be formed by bead blasting, either of the reflector itself or of a mold used to form the reflector. As an example, bead blasting can be performed with beads on the order of 0.001 inch in diameter. A metallic or a dielectric coating may be formed over the roughed up surface.

BRIEF DESCRIPTION OF THE DRAWINGS

FIG. 4b is a side cutaway view of the conical reflector of FIG. 4a.

DETAILED DESCRIPTION OF THE PREFERRED EMBODIMENT

Figure 1:
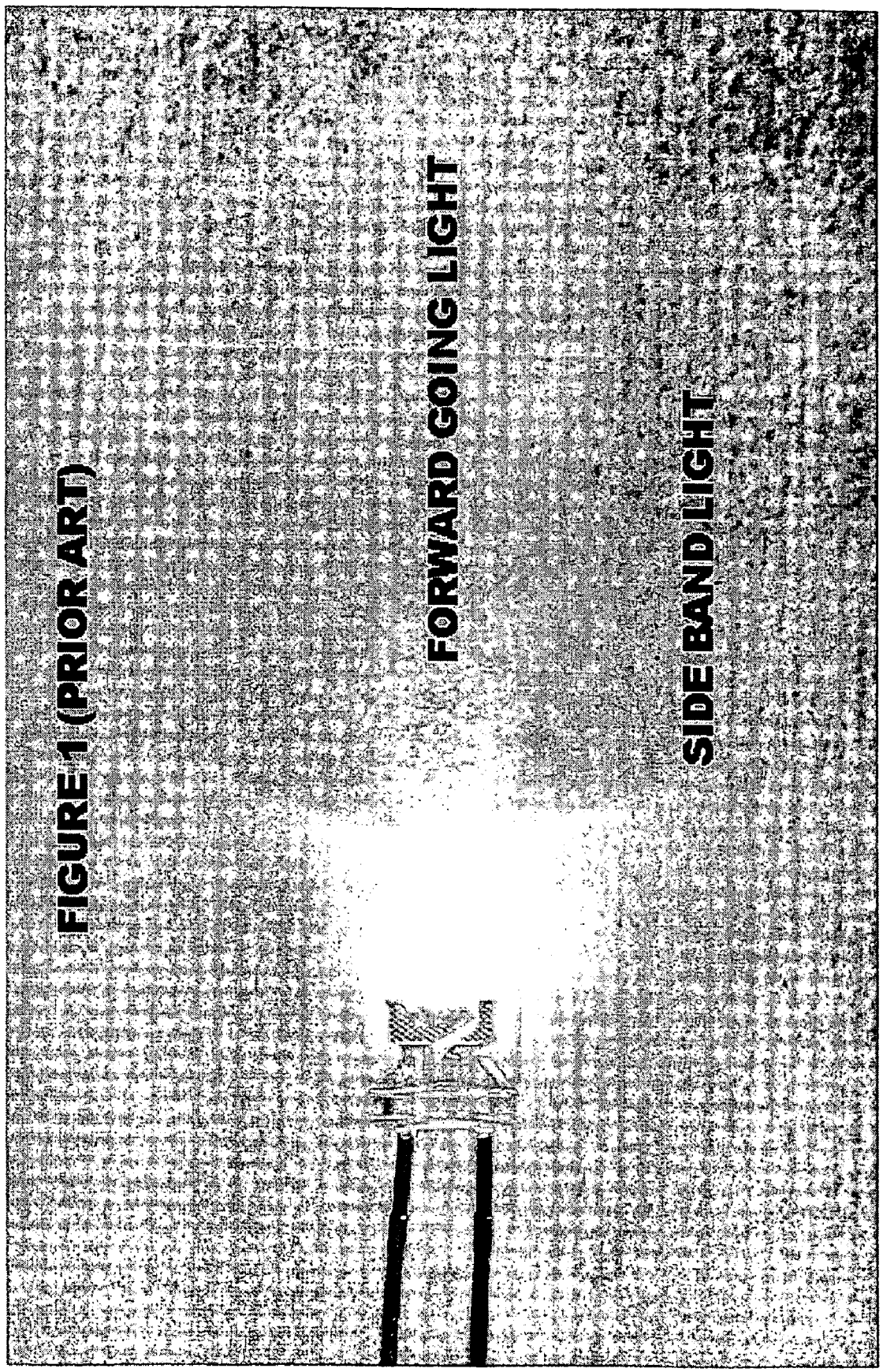
FIG. 1 (prior art) is an image showing the light generated by a conventional LED.
Figure 2:
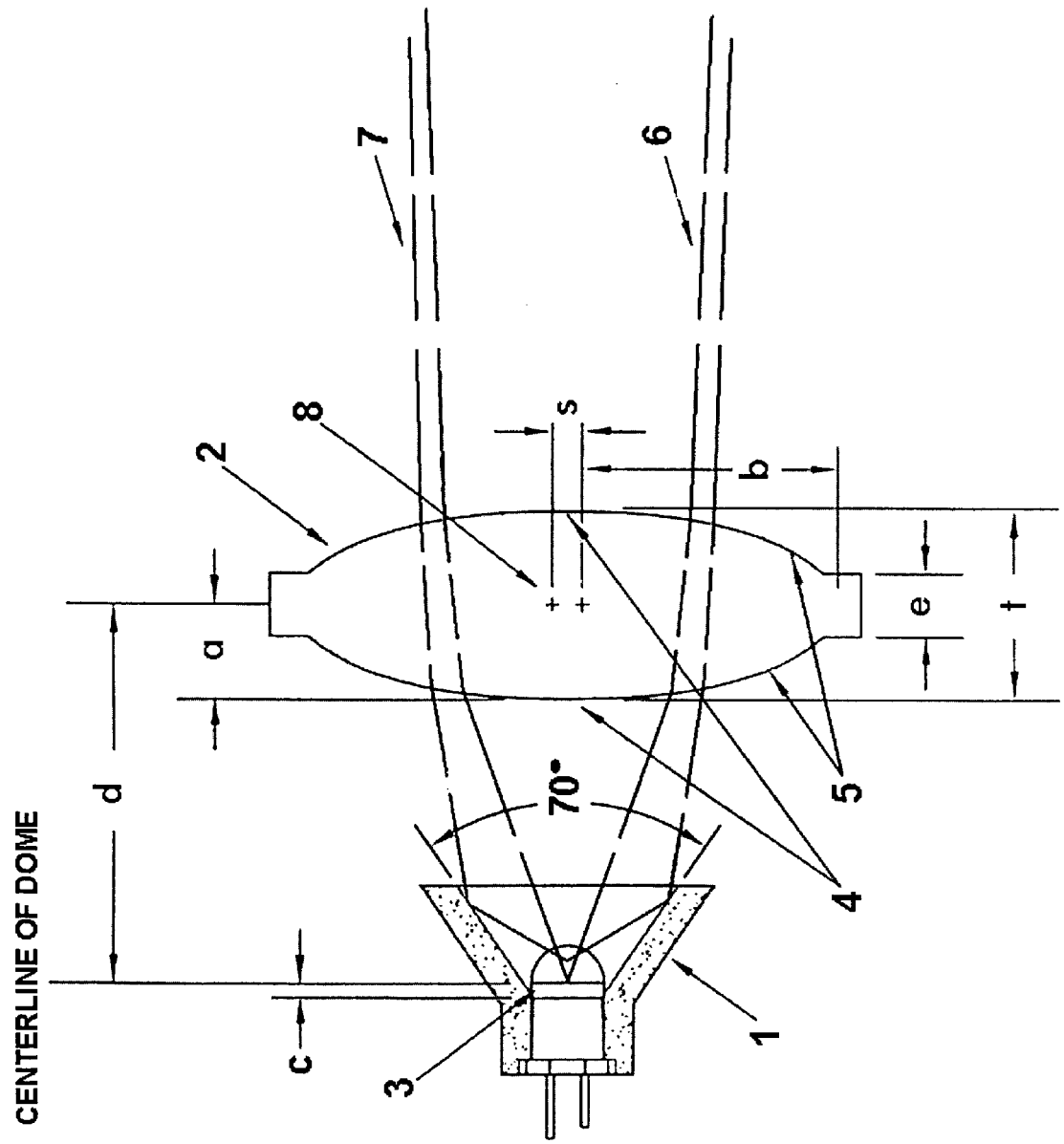
FIG. 2 is a side schematic view of LED light collecting and transmitting apparatus according to the present invention.

FIG. 2 is a side schematic view of LED light collecting and transmitting apparatus according to the present invention. The present invention comprises three important elements:
(1) LED 3;
(2) conical reflector 1 for collecting light emitted to the sides of LED 3, the conical reflector having a slightly roughed up surface in order to scatter light for a more uniform beam; and
(3) lens 2 specially designed to focus the collected light into a near-collimated beam LED 3 is generally a conventional LED of the kind having a base, a light element and a domed transparent plastic housing attached to the base and covering the light element. Such an LED produces a bright band of light at the apex of its plastic housing, because of total internal reflection inside the plastic. This light is generally wasted. FIG. 1 (prior art) illustrates the light generated by a typical LED.

Reflector 1 has a highly reflecting, but slightly roughed up, inside surface.

Preferably, the reflector is a cone with about a 70° angle. This configuration redirects the sideband light from LED 3 forward. Reflector 1 can be metal or plastic which is bead blasted and metallic or dielectrically coated. The roughed up surface of reflector 1 is shown in more detail in FIGS. 4a and 4b. If made of plastic, a metallic coating needs to be applied to the inside surface. When placed about the LED it redirects side band light in a forward direction. A bright shaped oval of light at the apex of LED 3's plastic housing is produced by total internal reflection inside the plastic. The light emitted from this bright spot exits the LED nearly perpendicular to the normal forward going light. The side band light has between 10 and 20% of the light output power of the forward going light. If no reflector is used, this light is wasted.

Returning to FIG. 2, conical reflector 1 preferably has about a 70-degree cone angle to redirect the side band light forward through lens 3. The axial position of diode 3 inside reflector 1 determines how much light is collected and where it will overlap the forward going light. Preferably the conical reflecting surface should intersect LED 3 0.04 inches below the centerline of the hemispherical dome of the LED housing in order to optimize light gathering and beam overlap. This distance is designated (c) in FIG. 1.

Reflector 1, as described above, will place side band light on top of the forward going light approximately 10 feet in front of the lens. This increases the brightness of the output beam and enhances the efficiency of any LED illumination device by utilizing as much of the light generated as possible.

Lens 2 is specially designed and configured to focus the light directly from LED 3 and the light reflected from reflector 1 into a near-collimated substantially uniform beam 6. The lens has two important features. First, it includes a flat spot 4 in the center of each of its curved surfaces 5. Second, the curved surfaces 5 are elliptical rather than spherical. The separation between the ellipse centers equals the flat spot diameters.

The flat spots 4 are preferably designed according to the following equation:

$$0.05d \leq s \leq 0.1d,$$

where (s) is the diameter of flat spot 4 and (d) is the distance from the centerline of LED 3 to the center of lens 1. The diameter (s) of flat spots 4 generally should not be less than 5% or greater than 10% of the separation distance, for best performance. The flat spot produces a near-uniform beam, rather than an image of the LED (with light and dark spots) as is produced by a conventional lens.

The elliptical curvature of the two curved surfaces 5 of lens 1 is required to catch and nearly collimate the quickly diverging light from LED 3. Most lenses have spherical surfaces, but this type of lens cannot catch and collimate the quickly diverging light from LED 3. The elliptical curvature of surfaces 5 becomes more pronounced with increasing radius allowing the elliptical lens to better collimate this light.

Preferably, the major axis of the ellipse is less than 0.7 times the distance d. In addition, the distance between the center of the ellipses should be about (s), the diameter of the flat spots.

The equation which describes an elliptical surface is:

$$\frac{x^2}{(a)^2} + \frac{y^2}{(b)^2} = 1,$$

where (a) is the length of the minor axis or one half the thickness of lens 2, and (b) is the length of the major axis or one half the diameter of the lens, if the curvatures on both sides were allowed to meet. So, the equation which describes the relationship between the diode/lens separation distance and the major axis is:

$$(b) \geq (0.7)(d),$$

where (d) is the distance from LED 3 to the center of lens 2.

This equation states that in order to sufficiently collect the light from the LED/Reflector assembly, the major axis of each elliptical surface of the lens must be equal to or greater than about 70% of the separation distance between the LED and the center of the lens. A major axis less than this value will result in a loss of forward projected light due to beam clipping.

In order to produce a more collimated beam of light for any given separation distance (d), the minor axis must be increased. If the lens is made from plastic using injection mold fabrication processes, the ratio of edge thickness (e) to center thickness should not exceed 3 to 1 in order to avoid surface depressions. This ratio gives an upper limit for the lens thickness for any given edge thickness. Based on this, if the separation between LED 3 and lens center is 1 inch and the edge thickness of the lens is 0.16 inches, the equation that describes the elliptical surfaces of the lens is:

$$\frac{x^2}{(0.24)^2} + \frac{y^2}{(0.70)^2} = 1$$

As a final key point, a distance equal to the diameter of the flat spots preferably separates the centers of the ellipses. A lens 2 with these design features will effectively collect and nearly collimate the forward and reflected light produced by the LED/reflector assembly.

Figure 3:
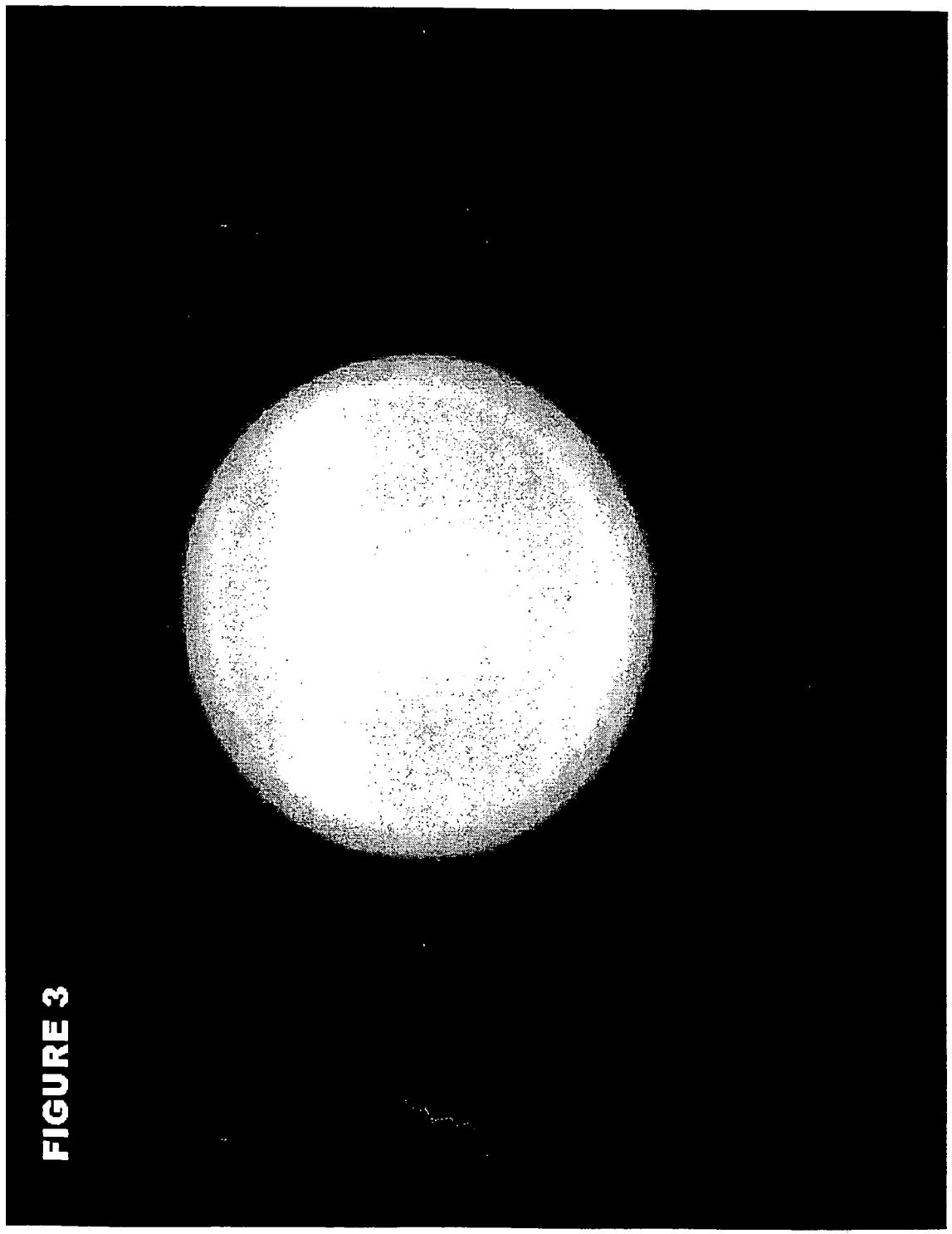
FIG. 3 is an image of the uniform field of light generated by the apparatus of FIG. 2.

FIG. 3 is an image of the near-uniform field of light 6 generated by the apparatus of FIG. 2. The beam was shining on a surface 24 inches from the lens. The central high intensity beam is approximately 8 inches in diameter; the outer field of light is approximately 18 inches in diameter.

Figure 4A:
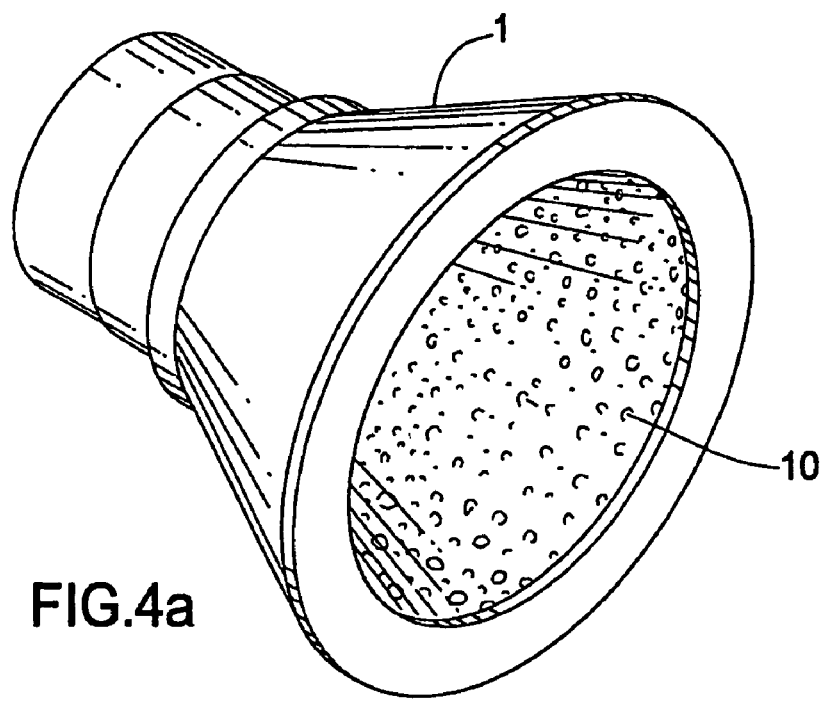
FIG. 4a is an isometric drawing of the conical reflector of FIG. 2 which shows the slightly roughed up surface of the present invention.
Figure 4B:
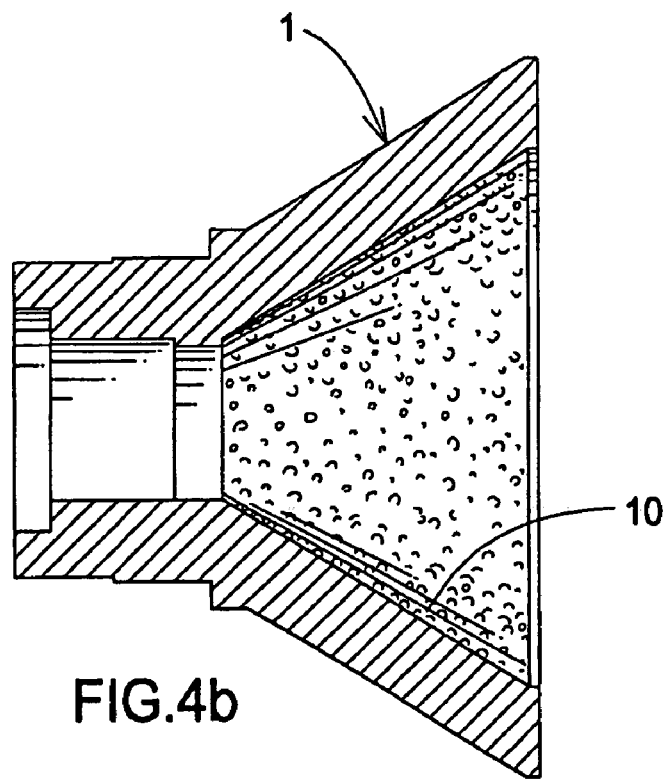

FIG. 4a is an isometric drawing of the conical reflector 1 of FIG. 2 which shows the slightly roughed up surface 10 of the present invention. Note that the surface roughness 10 is not to scale, but is exaggerated for illustrative purposes. FIG. 4b is a side cutaway view of the conical reflector 1 of FIG. 4a. By slightly roughing up surface 10 of reflector 1 prior to plating, an even more uniform beam 6 can be obtained from the reflector & lens system of FIG. 2.

The light scattering created by the micro-sized peaks and valleys on the reflector's surface 10 has the effect of spreading brighter regions of light into areas of less light. Brighter and darker areas of illumination are consequently blurred together. The larger the peaks and valleys, the greater the blurring effect within the central beam. If the peaks and valleys are made too large however, the light within the central beam becomes too diffuse and begins to spread outside the central beam, thereby reducing the beam's overall brightness. Through experimentation it was found that by bead blasting the reflector 1's surface 10 with beads 0.001" in diameter, optimum uniform illumination and central beam brightness could be obtained. Beads of lesser or greater size can of course be used to obtain a particular desired result. For production purposes the bead blasting is preferably applied to the injection mold so that the parts produced from the mold have the desired surface quality and are ready to have a metallic or dielectric coating applied.

Those skilled in the art will appreciate that various modifications to the exemplary embodiments are within the scope of the patent.

The invention claimed is:

1. Apparatus for collecting and transmitting light in a near-uniform column from an LED having a base, a light element and a domed transparent plastic housing attached to the base and covering the light element, the apparatus comprising:
   a conical reflector disposed about the base of the LED for collecting sideband light from the LED light element and transmitting it forward;
   wherein the conical reflector includes a roughed up inside surface in order to scatter the transmitted light;
   a lens disposed opposite and apart from the housing of the LED for focusing the direct and reflected light from the LED, wherein the distance between the center of the lens and the center of the domed housing on the LED is (d);
   wherein the lens is bounded by two opposite, substantially elliptical surfaces, where (a) is the half thickness of the lens and (b) is the half diameter of the lens and wherein each surface includes a flat spot having diameter (s).

2. The apparatus of claim 1 wherein flat spot diameter (s) is between about 5% and 10% of a separation distance (d).

3. The apparatus of claim 1 wherein the conical reflector forms a cone angle of about 70°.

4. The apparatus of claim 1 wherein the conical reflector intersects the LED at an offset distance (c) of about 0.04 inches from the center of the domed housing on the LED toward the base.

5. The apparatus of claim 1 wherein the half diameter (b) of the lens is greater than or equal to about 70% of separation distance (d).

6. The apparatus of claim 1 wherein the half thickness of the lens (a) is approximately equal to the spot diameter (s).

7. The apparatus of claim 1 wherein the half thickness of the lens (a) is approximately equal to 1.5 times the edge thickness (e) of the lens.

8. The apparatus of claim 1 wherein (d) is approximately 1 inch, half thickness (a) is about 0.24 inches, half diameter (b) is about 0.70 inches, and edge thickness (e) of the lens is about 0.16 inches.

9. The apparatus of claim 1 wherein the surface roughness was formed by bead blasting.

10. The apparatus of claim 9 wherein the bead blasting was performed with beads on the order of 0.001 inch in diameter.

11. The apparatus of claim 9 wherein the bead blasting was applied to a mold used to form the reflector.

12. The apparatus of claim 1 further including one of either a metallic or a dielectric coating formed over the roughed up surface.

13. The apparatus of claim 12 wherein the half thickness of the lens (a) is approximately equal to the spot diameter (s).

14. The apparatus of claim 12 wherein the half thickness of the lens (a) is approximately equal to 1.5 times the edge thickness (e) of the lens.

15. The apparatus of claim 12 wherein the surface roughness was formed by bead blasting.

16. The apparatus of claim 15 wherein the bead blasting was performed with beads on the order of 0.001 inch in diameter.

17. The apparatus of claim 15 wherein the bead blasting was applied to a mold used to form the reflector.

18. Apparatus for collecting and transmitting light in a near-uniform column from an LED having a base, a light element and a domed transparent plastic housing attached to the base and covering the light element, the apparatus comprising:
   a conical reflector disposed about the base of the LED for collecting sideband light from the LED light element and transmitting it forward, wherein the conical reflector includes an inside surface that is slightly roughed up in order to scatter the transmitted light;
   a lens disposed opposite and apart from the housing of the LED for focusing the direct and reflected light from the LED, wherein the distance between the center of the lens and the center of the domed housing on the LED is (d);
   wherein the lens is bounded by two opposite, substantially elliptical surfaces, where (a) is the half thickness of the lens and (b) is the half diameter of the lens and wherein each surface includes a flat spot having diameter (s); and
   wherein flat spot diameter (s) is between about 5% and 10% of a separation distance (d).

19. The apparatus of claim 18 wherein the conical reflector forms a cone angle of about 70°.

20. The apparatus of claim 18 wherein the conical reflector intersects the LED at an offset (c) of about 0.04 inches from the center of the domed plastic housing toward the base.

21. The apparatus of claim 18 wherein the half diameter (b) of the lens is greater than or equal to about 70% of separation distance (d).

22. The apparatus of claim 18 further including one of either a metallic or a dielectric coating formed over the roughed up surface.

23. A method of fabricating an apparatus for collecting and transmitting light in a near-uniform column from an LED having a base, a light element and a domed transparent plastic housing attached to the base and covering the light element, the method comprising the steps of:
   forming a conical reflector;
   roughing up an inside surface of the reflector;
   disposing the reflector about the base of the LED for collecting sideband light from the LED light element and transmitting it forward;
   forming a lens bounded by two opposite, substantially elliptical surfaces, wherein each surface includes a flat spot; and
   placing the lens opposite and apart from the housing of the LED for focusing the direct and reflected light from the LED.

24. The method of claim 23 wherein the step of roughing up the surface is performed by bead blasting.

25. The method of claim 24 wherein the bead blasting step is performed with beads on the order of 0.001 inch in diameter.

26. The method of claim 24 wherein the step of forming the reflector is performed with a mold, and the bead blasting step is performed on the mold.

27. The method of claim 23 further including the step of applying one of either a metallic or a dielectric coating over the roughed up surface.

* * * * *